(12) United States Patent
Katayama et al.

(10) Patent No.: US 6,443,185 B1
(45) Date of Patent: Sep. 3, 2002

(54) FUEL HOSE

(75) Inventors: Kazutaka Katayama; Shinji Iio, both of Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/946,136

(22) Filed: Sep. 5, 2001

(30) Foreign Application Priority Data

Sep. 5, 2000 (JP) ........................................ 2000-267859
Aug. 31, 2001 (JP) ........................................ 2001-263947

(51) Int. Cl.⁷ ................................................. F16L 11/00
(52) U.S. Cl. ........................ 138/137; 138/140; 138/141; 138/DIG. 7
(58) Field of Search ................................ 138/137, 140, 138/141, 145, 146, DIG. 7

(56) References Cited

U.S. PATENT DOCUMENTS 6,089,278 A * 7/2000 Nishino et al. ............. 138/137
6,279,615 B1 * 8/2001 Iio et al. ...................... 138/137

FOREIGN PATENT DOCUMENTS

| JP | 04-224384 | 8/1992 |
|----|-----------|--------|
| JP | 05-322045 | 12/1993 |
| JP | 06-079846 | 3/1994 |
| JP | 06-172507 | 6/1994 |
| JP | 07-096564 | 4/1995 |
| JP | 2000-071407 | 3/2000 |
| JP | 2000-154890 | 6/2000 |

* cited by examiner

Primary Examiner—Patrick Brinson
(74) Attorney, Agent, or Firm—Armstrong, Westerman & Hattori, LLP

(57) ABSTRACT

A fuel hose which comprises at least one layer including an inner layer composed of a resin composition. The resin composition essentially comprises a polyester resin including at least one of polybutylene naphthalate and polyethylene naphthalate and further comprises a phosphate.

2 Claims, 1 Drawing Sheet

FUEL HOSE

BACKGROUND OF THE INVENTION

1. Field of the Invention

The present invention relates to a fuel hose and, more particularly, to a fuel hose for automobile fuel line.

2. Description of the Art

Fuel hoses are conventionally used for automobile fuel line. Typically, such a fuel hose is of a single layer structure or of a multi-layer structure having two or more layers. An inner layer of the fuel hose to be in contact with a fuel is composed of a polyamide resin (nylon), a fluororesin or the like. The polyamide resin serves as a barrier against ordinary gasoline fuel, but has an extremely poor barrier property against so-called gasohol (a mixture of a gasoline and an alcohol). On the other hand, the fluororesin has an excellent barrier property against gasoline fuel and gasohol, but is an expensive material which thereby leads to an increase in production costs. In this connection, polyester resins attract attention as a resin material which are less expensive than a fluororesin and have a better barrier property against gasohol than a polyamide resin and, it has been proposed that a fuel hose be produced by employing polybutylene terephthalate (PBT).

PBT generally has a better barrier property against gasohol than a conventional polyamide resin, but is still insufficient in barrier property when evaluated on stricter criteria which requires a further improved gasohol permeation resistance. In the future, it will be environmentally preferred to use a gasohol containing gasoline and an alcohol (methanol, ethanol or the like) as an automobile fuel for cleaner automobile emissions. Therefore, these fuel hoses are required to have a more effective barrier property against gasohol. In the meantime, the present applicant suggested a fuel hose comprising polybutylene naphthalate (PBN) for improvement of gasohol permeation resistance (Japanese Patent Unexamined Publication No. 2000-154890). However, it was found that this fuel hose had some problems in a viewpoint of hydrolytic resistance.

In view of the foregoing, it is an object of the present invention to provide a fuel hose which is excellent in gasohol permeation resistance and hydrolytic resistance.

SUMMARY OF THE INVENTION

In accordance with the present invention to achieve the aforesaid object, there is provided a fuel hose which comprises at least one layer including an inner layer composed of a resin composition, the resin composition essentially comprising a polyester resin including at least one of polybutylene naphthalate and polyethylene naphthalate and further comprising a phosphate.

The inventors of the present invention have conducted studies on a material for a fuel hose inner layer to provide a fuel hose having an excellent gasohol permeation resistance and hydrolytic resistance. As a result, the inventors have found that an inner layer composed of a resin composition comprising at least one of polybutylene naphthalate (PBN) and polyethylene naphthalate (PEN) among other polyester resins, provides a better gasohol permeation resistance than a conventional inner layer composed of PBT, and also have found that when the inner layer is composed of a resin composition which includes a phosphate in addition to the above polyester resin, the hose has an improved hydrolytic resistance, and then attained the present invention. This better gasohol permeation resistance is supposedly because PBN and PEN each have a higher crystallinity and a greater molecular size than PBT and thus provide a higher barrier effect. In general, the terminal carboxyl groups of the polyester resin are liable to influence the hydrolysis of the polyester resin. Since the phosphate blended in the resin composition reacts with these terminal carboxyl groups to prevent these carboxyl groups from functioning as a hydrolytic catalyst, the hydrolysis of the polyester resin is suppressed to thereby improve the hydrolytic resistance.

When the fuel hose is constituted by a single layer, the term "inner layer" means the single layer itself. When the fuel hose is of a multi-layer structure having two or more layers, the term "inner layer" means the innermost layer of the hose.

DETAILED DESCRIPTION OF THE INVENTION

The present invention will hereinafter be described in detail by way of embodiments thereof.

Figure 1:
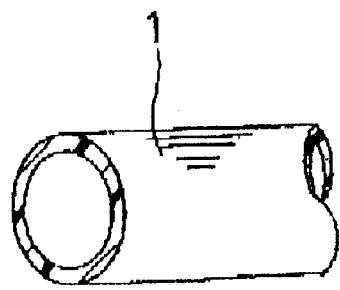
FIG. 1 is a perspective view, partly in section, illustrating an exemplary fuel hose according to the present invention.

A fuel hose according to the present invention may be of a single layer structure or of a multi-layer structure having two or more layers, but the structure thereof is not particularly limited. For example, the fuel hose has a single layer structure, as shown in FIG. 1, constituted by a layer of a specific resin composition alone which therefore is the inner layer.

The resin composition essentially comprises a specific polyester resin and further comprises a phosphate.

The polyester resin contained in the resin composition includes at least one of polybutylene naphthalate (PBN) and polyethylene naphthalate (PEN). The PBN or the PEN may partly be copolymerized with an ether or an ester. Of these polymers, PBN is preferred because of its well-balanced mechanical properties and flexibility.

The polyester resin preferably has a melt flow rate (MFR) of 0.5 to 20 g/10 min, particularly preferably 0.5 to 10 g/10 min, as measured at 260° C. with a load of 2160 g in conformity with ASTM D1238.

Preferred examples of the phosphate include aromatic phosphates such as tricresyl phosphate and resorcinol disphosphate.

The phosphate is preferably blended in the resin composition in a proportion of 0.5 to 5 parts per hundred parts of resin (hereinafter expressed simply as "phr"), particularly preferably 1 to 5 phr, based on 100 parts of the polyester resin. If the proportion of the phosphate is smaller than 0.5 phr, improvement of the hydrolytic resistance generally cannot be expected. If the proportion of the phosphate is greater than 5 phr, the resulting resin composition tends to have a deteriorated barrier property, and a deteriorated processibility due to a reduction in the melt viscosity.

The resin composition also may contain a conductive agent as required in addition to the polyester resin and the phosphate.

Examples of suitable conductive agents include carbon black (acetylene black or the like), graphite, carbon nanotube, potassium titanate, iron oxide, conductive titanium oxide, conductive zinc oxide, conductive indium oxide, ion conductive agents (quaternary ammonium salts, borates and surface active agents), all of which may be used either alone or in combination.

The conductive agent is preferably blended in the resin composition in a proportion of 4 to 15 phr.

The resin composition may further contain one or more of a pigment, a weatherability, a flame retardant or the like, as required, in a proportion that does not significantly deteriorate the properties of the resin composition.

The inventive fuel hose is produced, for example, in the following manner. The specific polyester resin and the phosphate are prepared, and an additive such as a conductive agent is added thereto, as required. The resulting mixture is kneaded by means of a kneader such as a KCK extruder (or a twin screw extruder) for preparation of a resin composition as a material for the inner layer of the hose. The resin composition may be pelletized by means of a pelletizer. Then, the resin composition is extruded by means of an extruder to produce a fuel hose of a single layer structure having an inner layer 1 alone (see FIG. 1).

The inner layer 1 typically has a thickness of 0.1 to 1.5 mm, preferably 0.3 to 1.0 mm.

Figure 2:
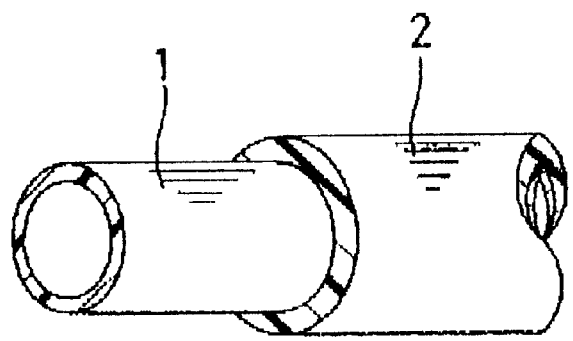
FIG. 2 is a perspective view, partly in section, illustrating another exemplary fuel hose according to the present invention.

The structure of the inventive fuel hose is not limited to the single layer structure shown in FIG. 1, but may be of a two layer structure having an inner layer 1, and an outer layer 2 provided on the outer periphery of the inner layer 1, as shown in FIG. 2. Further, the fuel hose may be of a three layer structure having an intermediate layer provided between an inner layer 1 and an outer layer 2, or of a multi-layer structure having four or more layers. The respective layers may be bonded to one another with an adhesive as required.

The outer layer 2 typically has a thickness of 0.05 to 1.0 mm, preferably 0.05 to 0.8 mm, depending on the application of the fuel hose.

Materials for the respective layers provided on the outer periphery of the inner layer 1 are not particularly limited, but examples thereof include rubber materials and resin materials. For example, the specific resin composition containing the aforesaid specific polyester resin and the phosphate may be employed as the material for the layer provided on the outer periphery of the inner layer 1.

The shape of the inventive fuel hose is not particularly limited, but the fuel hose may be a long hose, a short hose, or a corrugated hose.

The inventive fuel hose is advantageously used as an automobile fuel hose such as a feed hose, a return hose, a breather hose, an evaporation hose or a filler hose.

Next, an explanation will be given to Examples and Comparative Examples.

The following ingredients to be employed in Examples and Comparative Examples were prepared.

Polyester resins
(1) PBN having an MFR of 5 g/10 min as measured at 260° C. with a load of 2160 g in conformity with ASTM D1238.
(2) PEN having an MFR of 5 g/10 min as measured at 260° C. with a load of 2160 g in conformity with ASTM D1238.
(3) PBT having an MFR of 30 g/10 min as measured at 265° C. with a load of 2160 g in conformity with ASTM D1238.

Polyamide resin
A lower plasticity Polyamide 11 (Rilsan BESN BLACK P20TL available from Atofina, Inc. of Paris, France)
Phosphates
(1) An aromatic condensed phosphate (PX200 available from Daihachi Chemical Co., Ltd., of Osaka, Japan)
(2) Tricresyl phosphate (TCP available from Daihachi Chemical Co., Ltd. of Osaka, Japan)
Conductive agents
(1) Conductive carbon black (Ketchen Black EC available from Akzo Novel Co., Ltd., of Amergfoort, Netherland)
(2) Acetylene black (Denka Black available from Denki Kagaku Kogyo K.K. of Tokyo, Japan)
Other additives
Polycarbodiimide (Carbodilite available from Nisshinbo Industries, Inc. of Tokyo, Japan)
Nylon 6 (amine-modified nylon G1013 available from Ube Kosan Co., Ltd. of Yamaguchi, Japan)

Examples 1 to 3 and Comparative Examples 1 to 6

Resin compositions (inner layer materials) were each prepared by blending the ingredients in a blend ratio as shown in Tables 1 and 3, kneading the resulting mixture by means of a KCK extruder (available from KCK Engineering Co., Ltd. of Osaka, Japan), and pelletizing the mixture. When the phosphate PX200 and/or the conductive agent were employed, the resulting pellets were blended therewith on a dry basis. When the phosphate TCP was employed, the pellets were impregnated therewith on a wet basis. Then, the resin compositions were each extruded by means of an extruder. Thus, a fuel hose (inner diameter of 6 mm) was produced, which was of a single layer structure having an inner layer alone.

Examples 4 to 6

Pelletized resin compositions (inner layer materials) were each prepared in substantially the same manner as in Example 1 by blending ingredients in a blend ratio as shown in Table 1. A pelletized resin composition (outer layer material) was prepared in accordance with the same formulation as the resin composition in Example 1. The inner layer materials were each coextruded with the outer layer material by means of two extruders. Thus, a fuel hose (inner diameter: 6 mm) was produced, which was of a two layer structure having an inner layer and an outer layer provided on the outer periphery of the inner layer.

Example 7

A pelletized resin composition (inner layer material) was prepared in substantially the same manner as in Example 1 by blending ingredients in a blend ratio as shown in Table 2. A pelletized resin composition prepared in accordance with the same formulation as the resin composition in Example 2 was blended with 100 parts of a pelletized sheathing material on a dry basis, and the resulting mixture was kneaded by means of a KCK extruder (available from KCK Engineering Co., Ltd. of Osaka, Japan) for preparation of a pelletized intermediate layer material. Further, polyamide 12 (Rilsan AESN BLACK P40TL available from Atofina, Inc. of Paris, France) was prepared as an outer layer material. The inner layer material was coextruded with the intermediate layer material and the outer layer material by means of three extruders. Thus, a fuel hose (inner diameter of 6 mm) was produced, which was of a three layer structure having an inner layer, an intermediate layer provided as an adhesive layer on the outer periphery of the inner layer, and an outer layer provided on the outer periphery of the intermediate layer.

Comparative Examples 7 and 8

Pelletized resin compositions (inner layer materials) were each prepared in substantially the same manner as in Example 1 by blending the ingredients in a blend ratio as shown in Table 4. Further, a pelletized resin composition (outer layer material) was prepared in accordance with the same formulation as the resin composition in Comparative Example 5. Then, the inner layer materials were each coextruded with the outer layer material by means of extruders. Thus, a fuel hose (inner diameter: 6 mm) was prepared, which was of a two layer structure having an inner layer and an outer layer provided on the outer periphery of the inner layer.

The fuel hoses of the Examples and the Comparative Examples thus produced were each evaluated based on the following criteria. The results are shown in Tables 1 to 3.

Extrudability

The extrudability of the resin composition (inner layer material) for each of the fuel hoses was evaluated. In Tables 1 to 4, a symbol "○" indicates a good extrudability, while a symbol "×" indicates a poor extrudability manifested by a surface roughness of the inner layer.

Surface resistivity

The surface resistivity on the inner periphery of the inner layer of each of the fuel hoses was measured in conformity with GM213.

Initial elongation at break (EB)

The fuel hoses were each cut into halves for preparation of an ASTM type V dumbbell. With the use of the dumbbell, the elongation at break (EB) of the fuel hose was measured in conformity with ASTM D638.

Heat aging resistance

The aforesaid dumbbell was subjected to heat at 130° C. for 400 hours, and then the EB of the fuel hose was measured for evaluation of the heat aging resistance of the fuel hose.

Hydrolytic resistance

After the aforesaid dumbbell was immersed in pure water in a pressure vessel at 120° C. for 168 hours, the EB of the fuel hose was measured for evaluation of the hydrolytic resistance of the fuel hose.

Gasohol permeability

A gasohol containing Fuel C (containing 50 vol % of toluene and 50 vol % of isooctane) and methanol in a ratio of 85:15 (vol %) was filled in each of the fuel hoses (length: 1 m), and allowed to stand at 60° C. for 7 days. Thereafter, the gasohol was newly filled in the fuel hose, and again allowed to stand at 60° C. for 7 days. A weight difference was determined for evaluation of the gasohol permeability of the fuel hose.

Presence of cracks

The fuel hoses subjected to the gasohol permeability test were each bent by 180 degrees, and then cut into halves. The inner peripheral surface of the hose was visually observed for cracks.

TABLE 1

| | Examples (parts) | | |
|---|---|---|---|
| | 1 | 2 | 3 |
| PBN | 100 | 100 | 100 |
| PEN | — | — | — |
| PX200 | 1 | 3 | — |
| TCP | — | — | 3 |
| Ketchen black EC | — | — | — |
| Thickness of inner layer (mm) | 1 | 1 | 1 |
| Thickness of outer layer (mm) | — | — | — |
| Extrudability | ○ | ○ | ○ |
| Surface resistivity ($\Omega$) | $2 \times 10^{13}$ | $1 \times 10^{13}$ | $2 \times 10^{13}$ |
| Initial elongation at break (%) | 300 | 280 | 290 |
| Heat aging resistance: reduction in extensibility (%) | −20 | −10 | −17 |
| Hydrolytic resistance: reduction in extensibility (%) | −10 | −5 | −10 |
| Gasohol permeability (g/m/day) | 0.2 | 0.2 | 0.3 |
| Cracks | No | No | No |

TABLE 2

| | Examples (parts) | | | |
|---|---|---|---|---|
| | 4 | 5 | 6 | 7 |
| PBN | 100 | 100 | 100 | 100 |
| PX200 | 3 | — | — | 3 |
| TCP | — | 5 | 5 | — |
| Ketchen black EC | 5 | 5 | — | 5 |
| Denka black | — | — | 15 | — |
| Thickness of inner layer (mm) | 0.1 | 0.1 | 0.1 | 0.3 |
| Thickness of intermediate layer (mm) | — | — | — | 0.1 |
| Thickness of outer layer (mm) | 0.9 | 0.9 | 0.9 | 0.6 |
| Extrudability | ○ | ○ | ○ | ○ |
| Surface resistivity ($\Omega$) | $2 \times 10^{4}$ | $1 \times 10^{4}$ | $1 \times 10^{4}$ | $2 \times 10^{4}$ |
| Initial elongation at break (%) | 210 | 230 | 220 | 250 |
| Heat aging resistance: reduction in extensibility (%) | −25 | −20 | −30 | −25 |
| Hydrolytic resistance: reduction in extensibility (%) | −5 | −10 | −15 | −10 |
| Gasohol permeability (g/m/day) | 0.2 | 0.3 | 0.3 | 0.4 |
| Cracks | No | No | No | No |

TABLE 3

| | Comparative Examples (parts) | | | | | |
|---|---|---|---|---|---|---|
| | 1 | 2 | 3 | 4 | 5 | 6 |
| PBN | 100 | — | — | — | — | — |
| PEN | — | 100 | — | — | — | — |
| PBT | — | — | 100 | — | 100 | 100 |
| Polyamide 11 | — | — | — | 100 | — | — |
| Carbodilite | — | — | — | — | 3 | — |

TABLE 3-continued

| | Comparative Examples (parts) | | | | | |
|---|---|---|---|---|---|---|
| | 1 | 2 | 3 | 4 | 5 | 6 |
| Nylon 6 | — | — | — | — | — | 10 |
| Ketchen black EC | — | — | — | — | — | — |
| Thickness of inner layer (mm) | 1 | 0.5 | 1 | 1 | 1 | 1 |
| Thickness of outer layer (mm) | — | — | — | — | — | — |
| Extrudability | ◯ | ◯ | ◯ | ◯ | ◯ | ◯ |
| Surface resistivity (Ω) | $5 \times 10^{13}$ | $3 \times 10^{13}$ | $4 \times 10^{13}$ | $7 \times 10^{13}$ | $1 \times 10^{13}$ | $3 \times 10^{13}$ |
| Initial elongation at break (%) | 240 | 200 | 260 | 280 | 250 | 230 |
| Heat aging resistance: reduction in extensibility (%) | −25 | −48 | −90 | −8 | −70 | −90 |
| Hydrolytic resistance: reduction in extensibility (%) | −30 | −65 | −95 | −10 | −40 | −95 |
| Gasohol permeability (g/m/day) | 0.1> | 0.1 | 0.7 | 5.5 | 1.0 | 4.3 |
| Cracks | No | No | No | No | Yes | No |

TABLE 4

| | Comparative Examples (parts) | |
|---|---|---|
| | 7 | 8 |
| PBT | 100 | 100 |
| Polyamide 11 | — | — |
| Carbodilite | — | — |
| Nylon 6 | — | — |
| Ketchen black EC | 2 | 20 |
| Thickness of inner layer (mm) | 0.1 | 0.1 |
| Thickness of outer layer (mm) | 0.9 | 0.9 |
| Extrudability | ◯ | X |
| Surface resistivity (Ω) | $5 \times 10^{12}$ | $5 \times 10^{2}$ |
| Initial elongation at break (%) | 250 | 180 |
| Heat aging resistance: reduction in extensibility (%) | −95 | −98 |
| Hydrolytic resistance: reduction in extensibility (%) | −95 | −98 |
| Gasohol permeability (g/m/day) | 1.0 | 1.2 |
| Cracks | No | No |

As can be understood from the above results, the fuel hoses of Examples 1 to 7 were each excellent in gasohol permeation resistance with a low gasohol permeability and also were each excellent in hydrolytic resistance.

On the other hand, the fuel hoses of Comparative Examples 1 and 2 were each inferior in hydrolytic resistance because the resin compositions did not contain the phosphates. The fuel hose of Comparative Example 3 produced by employing the PBT-based resin composition was poor in gasohol permeation resistance by having a greater gasohol permeability than the fuel hoses of the Examples. The fuel hose of Comparative Example 4 produced by employing the Polyamide 11-based resin composition had an extremely poor gasohol permeation resistance. The fuel hoses of Comparative Examples 5 to 8 produced by employing the PBT-based resin compositions each had a poor gasohol permeation resistance by having a greater gasohol permeability than the fuel hoses of the Examples. The fuel hose of Comparative Example 5 had an improved hydrolytic resistance because polycarbodiimide contained in the resin composition reacted with terminal carboxyl groups of PBT, but the hose was embrittled during use. This is because polycarbodiimide was highly reactive with hydroxyl groups of the alcohol (methanol) contained in the gasohol. Further, the fuel hose of Comparative Example 3 suffered from cracks when the hose was bent after the gasohol permeation test.

As described above, the inventive fuel hose, which comprises at least one layer including an inner layer composed of the resin composition essentially containing the specific polyester resin and further containing the phosphate, is excellent in gasohol permeation resistance.

What is claimed is:

1. A fuel hose comprising at least one layer including an inner layer composed of a resin composition, the resin composition essentially comprising a polyester resin including at least one of polybutylene naphthalate and polyethylene naphthalate and further comprising a phosphate.

2. A fuel hose as set forth in claim 1, wherein the phosphate is present in the resin composition in a proportion of 0.5 to 5 parts by weight based on 100 parts by weight of the polyester resin.

\* \* \* \* \*